United States Patent [19]
Elgert

[11] Patent Number: 5,471,121
[45] Date of Patent: Nov. 28, 1995

[54] CIRCUIT FOR PRODUCING A DYNAMIC FOCUSING VOLTAGE IN A TELEVISION SET

[75] Inventor: Achim Elgert, Bad Dürrheim, Germany

[73] Assignee: Deutsche Thomson-Brandt GmbH, Germany

[21] Appl. No.: 200,604

[22] Filed: Feb. 23, 1994

Related U.S. Application Data

[63] Continuation of PCT/EP92/01949, Aug. 25, 1992

[30] Foreign Application Priority Data

Sep. 4, 1991 [DE] Germany ............ 41 29 335.5

[51] Int. Cl.⁶ .................................... H01J 29/58
[52] U.S. Cl. ........................................ 315/382.1
[58] Field of Search ...................... 315/382, 382.1; 348/806

[56] References Cited

U.S. PATENT DOCUMENTS 4,683,405   7/1987   Truskalo et al. ................. 315/382
4,916,365   4/1990   Arai ................................. 315/382
5,341,071   8/1994   George ........................... 315/382.1

FOREIGN PATENT DOCUMENTS 61-137415   11/1986   Japan.

*Primary Examiner*—Theodore M. Blum
*Attorney, Agent, or Firm*—Joseph S. Tripoli; Joseph J. Laks; Daniel E. Sragow

[57] ABSTRACT

A circuit for generating a dynamic focusing voltage in a television receiver utilizing overscan periods includes a focusing voltage generator. The focusing voltage is compared to a reference voltage and a switching signal is provided when the focusing voltage goes below the reference voltage. A switch is responsive to the switching signal and provides a direct focusing voltage during the overscan periods. The direct focusing voltage has a level which maintains the arithmetic mean of the focusing voltage the same during the normal scan period and the overscan periods.

5 Claims, 2 Drawing Sheets

CIRCUIT FOR PRODUCING A DYNAMIC FOCUSING VOLTAGE IN A TELEVISION SET

This is a continuation of PCT application PCT/EP92/01949 filed Aug. 25, 1992 by Achim Elgert and titled "CIRCUIT FOR PRODUCING A DYNAMIC FOCUSING VOLTAGE IN A TELEVISION SET".

The invention is directed to a circuit for producing a dynamic focusing voltage in a television set. The dynamic focusing for a picture tube of this type is described in "Grundig Technische Informationen", July 1958, pages 17–18.

With picture tubes having larger screens, such as 16:9 for example, additional dynamic focusing is provided in addition to the usual static focusing. Thereby, a direct voltage of approximately 7–8 kV is supplied to the focusing electrode of the picture tube and a parabolic focusing voltage is superimposed on this voltage via an alternating voltage coupling. This applies both for the horizontal and for the vertical directions of deflection. For operating modes having different picture formats and different deflection amplitudes with overscanning of the screen, there exists the requirement that the peak-to-peak value of the parabolic focusing voltage remain constant so that the focusing voltage will remain unchanged in relation to the position of the deflection. the reason for the maintenance of the constant peak-to-peak value of the parabola is that unnecessary modulation of the parabola is avoided since a higher parabolic voltage is present in the overscanning phase of the visible picture amplitude and, in the second place, that a correction of the parabolic voltage can be undertaken during this overscanning phase.

In order for the effective focusing voltage to remain the same in relation to the position of the deflection for all of the operating modes, the arithmetic mean of the parabolic voltage for each larger picture format and also for the standard picture format must, because of the alternating voltage coupling, be constant. However, this is not directly the case since a parabolic voltage, which only extends over a part of the deflection period, has a lower arithmetic mean.

An object of the invention is to develop a circuit in which the dynamic focusing voltage always has the same arithmetic mean for all operating modes despite differing durations of this voltage within the deflection period.

A circuit for a dynamic focusing is described in U.S. Pat. No. 4,683,405 in which a parabolic voltage having the horizontal frequency is generated upon each appearance of a synchronizing signal. Therein, the parabolic voltage is obtained from a sawtooth voltage which has a rising portion, a falling portion and a portion having a flat waveform whereby only the length of the flat portion of the sawtooth voltage alters if the frequency of the synchronizing pulse changes.

A circuit for a television receiver is also described in U.S. Pat. No. 4,916,365 in which, in addition to the deflection by the deflection coil, a parabolic horizontal frequency voltage and a parabolic vertical frequency voltage are supplied to a control electrode of the picture tube whereby both parabolic voltages respectively increase from the mid-point of the screen to the edges of the screen. This additional brightness modulation serves to compensate for differences in brightness between the mid-point of the screen and the edges of the screen due to the different angles of incidence of the electron beam on the screen.

Thus, with the solution in accordance with the invention, the overscanning period of the electron beam, during which focusing is not necessary and during which, in addition, no focusing voltage is effective, is made use of, in an analogous manner, to add a direct voltage pulse to the focusing voltage. This direct voltage pulse actually does not have any effect as a dynamic focusing voltage. However, it does ensure that the parabolic correcting voltage together with the direct voltage pulse always has the same arithmetic mean for all operating modes. Thus, influencing of the actual parabolic correcting voltage during the picture reproduction is not required.

The invention will be explained hereinafter by means of embodiments with the help of the drawings. Therein:

Figure 1:
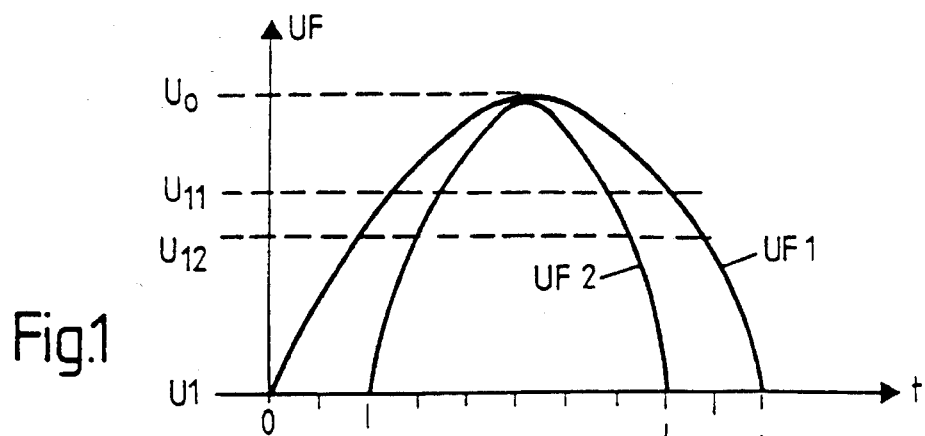
FIG. 1 shows parabolic focusing voltages for two operating modes.

FIG. 1 shows a focusing voltage UF1 for normal picture reproduction without overscanning. Voltage UF1 has a parabolic waveform during the vertical deflection period from 0–T. Voltage UF1 has the arithmetic mean value U11. Thus inevitably, with an alternating voltage coupling to the focusing electrode, this arithmetic mean value U11 is applied to the direct voltage present on the focusing electrode. The static focusing voltage of a focusing electrode is referenced by U1 in FIG. 1. Furthermore, FIG. 1 shows a focusing voltage UF2 for another picture format having overscanning of the electron beam from 0–t1 and t2–T on each occasion. The parabolic focusing voltage UF2 is thus effective over a shortened time period t1–t2. Since the amplitude remains the same, the arithmetic mean decreases to U12. Since U12 again falls to the value of the direct voltage on the focusing electrode due to the alternating voltage coupling thereto, the amplitude position of UF2 would alter relative to the direct voltage. The focusing voltage effective on the focusing electrode would no longer then have the correct value in relation to the deflection position.

Figure 2:
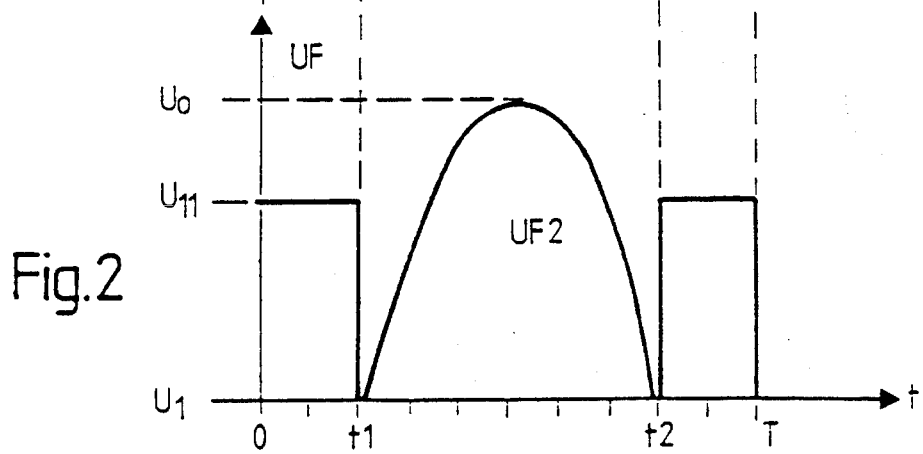
FIG. 2 shows the correction of the arithmetic mean in accordance with the invention.

In accordance with FIG. 2, the value of UF2 is switched to the direct voltage value U11 during the overscanning periods between 0–t1 and t2–T. The arithmetic mean, which results in FIG. 2 from the direct voltages during periods 0–t1 and t2–T and the dynamic voltage UF2 during t1–t2, then has the same value as the arithmetic mean of the focusing voltage UF1 in FIG. 1. The direct voltage pulses during the overscanning periods 0–t1 and t2–T thus correct the arithmetic mean value U12 which, of itself, is too small and which the voltage UF2 alone would have had from t1–t2.

Figure 3:
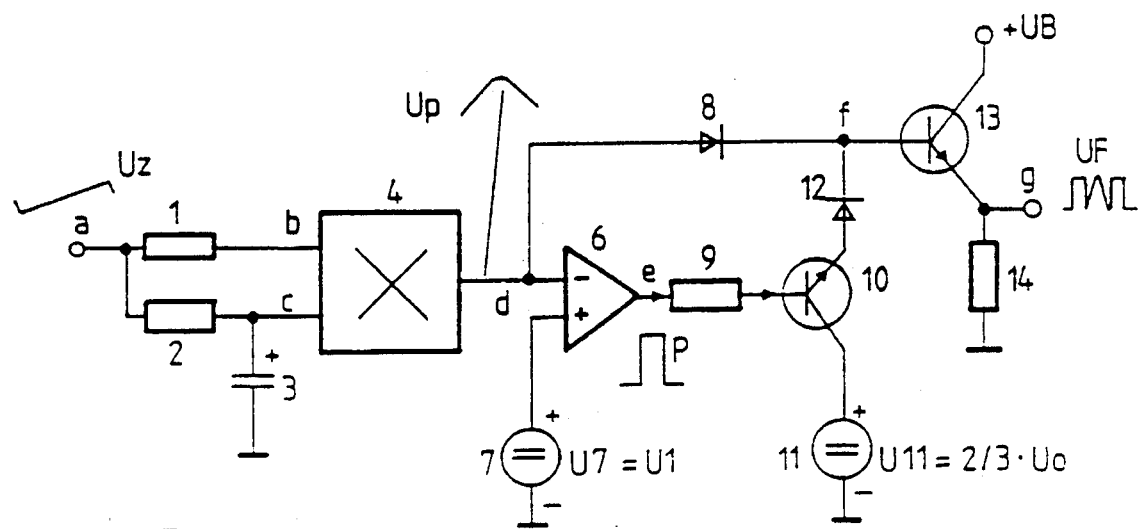
FIG. 3 shows a circuit for the correction of the arithmetic mean in accordance with FIG. 2 for a vertical frequency dynamic correction.

Firstly in FIG. 3, a vertical frequency sawtooth voltage Uz is extended unaltered from the terminal "a" via the resistor 1 to the input "b" of the multiplier 4. Moreover, Uz is extended via the filter means having the resistor 2 and the capacitor 3 to the input "c" of the multiplier 4 and produces there a direct voltage independent of the arithmetic mean value of Uz. The multiplier 4 works with two current inputs and produces a vertical frequency parabolic focusing voltage Up at its output "d". It is now assumed that the operational case with UF2 in accordance with FIG. 2 using the overscanning periods is occurring. The parabolic voltage Up from output "d" reaches the negative input terminal of the comparator 6 to whose positive input terminal a constant voltage U7 having the value of U1 from the voltage source 7 is applied. During period t1–t2, i.e., during the actual reproduction of the picture, Up or UF2 is greater than U1. the comparator 6, therefore, does not respond. Via the conductive diode 8, Up reaches the base terminal "f" of the transistor 13, which, together with the resistor 14, is operating as an emitter follower. During this period, UF2 reaches the output "g" unaltered.

During periods 0–t1 and t2–T, voltage UF2 falls below the value of U1. The comparator 6 responds and produces a positive pulse P at its output. Via the resistor 9, pulse P reaches the base of the transistor 10 the collector of which is connected to the voltage source 11 having the voltage value U11=⅔*Uo. Pulse P makes the transistor 10 conductive. The point "f" is thereby switched to the voltage U11 in accordance with FIG. 2, apart from the forward voltages of the transistor 10 and the diode 12. The positive voltage U11 at the point "f" blocks the diode 8 that serves for decoupling so that the portion of Up during periods 0–t1 and t2–T is cut-off and the desired waveform in accordance with FIG. 2 ensues.

Figure 4:
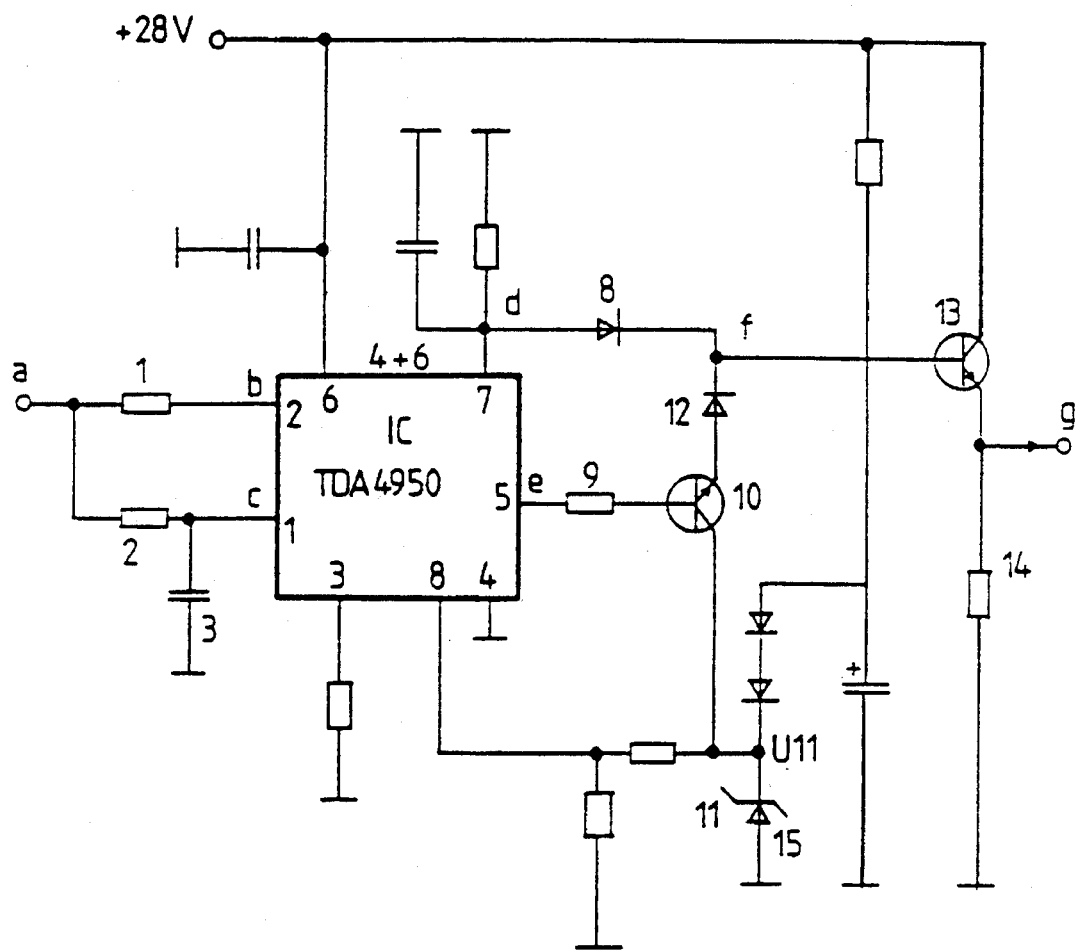
FIG. 4 shows a practical, proven embodiment of the circuit according to FIG. 3.

In the practical, proven circuit according to FIG. 4, the essential components of FIG. 3 are once more found. The multiplier 4 and the comparator 6 are formed by the illustrated IC of type TDA4950. The reference voltage source 7 of FIG. 3 is contained in the IC. The reference voltage source 11 of FIG. 3 is formed by the Zener diode 15. The focusing voltage UF in accordance with FIGS. 2, 3 is taken from the terminal "g" and supplied via an alternating voltage coupling in the form of a capacitor to the focusing electrode of the picture tube and superimposed on the static focusing voltage which is present there.

In the practical, proven embodiment in accordance with FIG. 4, the essential components had the following values.

Resistor 1: 57.6 kohm
Resistor 2: 10 kohm
Capacitor 3: 220 μF
Diodes 8 and 12: Type 1N4148
Transistor 10: Type BC548B
Transistor 13: Type BC547C
Resistor 14: 4.7 kohm

I claim:

1. A circuit for generating a dynamic focusing voltage in a television receiver having a tube utilizing overscan periods comprising:

means for generating a focusing voltage;

means for applying said focusing voltage to said tube during a normal scan period and during overscan periods;

means for comparing said focusing voltage and a reference voltage and providing a switching signal when said focusing voltage goes below said reference voltage;

switch means responsive to said switching signal for applying a direct focusing voltage to said tube during said overscan periods, said direct focusing voltage having a level which maintains the arithmetic mean of said focusing voltage the same during said normal scan period and said overscan periods.

2. The circuit of claim 1 wherein said switch means includes a voltage responsive switching means and a direct voltage source.

3. The circuit of claim 1 wherein said means for generating a focusing voltage includes a multiplier having a first input terminal for receiving a saw-tooth signal and a second input terminal for receiving a filtered saw-tooth signal and providing a parabolic focusing voltage.

4. The circuit of claim 2 wherein said means for applying includes a unilateral voltage responsive conduction device connected to said switching means at a junction, said junction being connected to said tube.

5. A method of generating a dynamic focusing voltage for a television receiver including a tube which overscans an electron beam, comprising the steps of:

deflecting said electron beam to trace a line of a visible display across the screen of the tube during a normal scan period between overscan periods; and applying a direct focusing voltage during said overscan periods, said direct focusing voltage having a level which maintains the arithmetic mean of the focusing voltage constant for said normal scan period and said overscan periods.

* * * * *